United States Patent [19]

Beckmann et al.

[11] 4,308,945
[45] Jan. 5, 1982

[54] APPARATUS FOR TRANSVERSELY CONVEYING PROFILED RODS AND RAILS

[75] Inventors: Wilhelm Beckmann, Ratingen; Friedel Mogendorf, Duisburg, both of Fed. Rep. of Germany

[73] Assignee: Schloemann-Siemag Aktiengesellschaft, Dusseldorf, Fed. Rep. of Germany

[21] Appl. No.: 113,186

[22] Filed: Jan. 18, 1980

[30] Foreign Application Priority Data

Jan. 18, 1979 [DE] Fed. Rep. of Germany ....... 2901811

[51] Int. Cl.³ .............................................. B65G 25/00
[52] U.S. Cl. ................................ 198/750; 104/173 R; 104/176; 198/858
[58] Field of Search ........ 198/773, 750, 485, 858–859, 198/343; 414/750; 104/173 R, 176, 196, 178

[56] References Cited

U.S. PATENT DOCUMENTS 2,725,970 12/1955 Wullschleger ................. 198/343 X
3,272,970 9/1966 Clark et al. ........................ 198/750

Primary Examiner—Robert B. Reeves
Assistant Examiner—Douglas D. Watts
Attorney, Agent, or Firm—Holman & Stern

[57] ABSTRACT

An apparatus for conveying profiled rods or rails in a direction transverse to their length, particularly from a rollerway to a cooling bed which comprises a plurality of adjacent carriages for conveying a profiled rod or rail and displaceable along said direction of conveyance is described. Each carriage has connected thereto a cable or chain moveable by a respective cable drum or chain wheels. The cable drums or chain wheels of the carriages are driven by a common drive means for effecting simultaneous displacement of all said carriages, and individual displacement means associated with each carriage effects stepless individual displacement of each carriage independently of the rotary position of its associated cable drum or chain wheel. The apparatus is able to cope with curved or obliquely disposed rods or rails.

5 Claims, 3 Drawing Figures

APPARATUS FOR TRANSVERSELY CONVEYING PROFILED RODS AND RAILS

BRIEF SUMMARY OF THE INVENTION

The invention relates to apparatus for conveying profiled rods and rails in a direction transverse to their length, particularly from a rollerway to a cooling bed.

In profiled steel rolling mills, the supply and delivery of profiled rods to rollerways and cooling beds is effected by a plurality of cross feeder carriages which are displaceable in unison in the respective transfer region. A problem may arise in that the profiles are not always straight or in that profiles with asymmetric cross-sections, such as rails, may bend or become placed obliquely during cooling on the cooling bed. Bending of asymmetric profiles may be counteracted by appropriate opposite pre-bending, so that the profiles become straight during cooling. It must be possible, however, to remove from the cooling bed cold rods which are curved and lying obliquely.

Apparatus for transversely conveying rods is already known, wherein the commonly-driven feeder carriages are provided with a plurality of openings in the support surface, and driver dogs may be selectively inserted into said openings for determining a straight or a curved abutment line. However, this arrangement has the disadvantage that the driver dogs must be repositioned by hand in a complicated manner for each length or change of cross-section.

The known art also includes apparatus for transversely conveying profiled rods having feeder carriages which are driven by cable arrangements, wherein the individual cable drums are adjustable by means of a worm gear on the driving shaft. This apparatus is constructionally expensive and manual operation is necessary in this case also.

Finally apparatus for transversely conveying profiled rods is also known, wherein each cable or chain arrangement for the individual feeder carriages is provided with its own separately controlled drive. This apparatus requires a high control expenditure for the necessary synchronized operation.

An object of the present invention is to mitigate these problems. Its aim is in particular to provide an apparatus for transversely conveying profiled rods and rails by means of feeder carriages which are driven by a common drive shaft and cable or chain arrangements, wherein pre-bending of the profiled rods and rails as well as the delivery and alignment thereof may be performable rapidly and reliably without manual time-consuming displacement of driver dogs or displacement of cable drums or chain wheels on their driving shaft.

The present invention provides apparatus for conveying profiled rods or rails in a direction transverse to their length, which comprises a plurality of adjacent carriages for conveying a profiled rod or rail and displaceable along said direction of conveyance, each carriage having connected thereto a cable or chain moveable by means of a respective cable drum or chain wheel, said cable drums or chain wheels of said plurality of carriages being driven by a common drive means for effecting simultaneous displacement of all said carriages, and individual displacement means associated with each carriage effecting stepless individual displacement of each said carriage independently of the rotary position of its associated cable drum or chain wheel.

In this way profiled rods and rails, for example, may be pre-bent in any desired manner whilst being supplied to a cooling bed and, during discharge, may be removed from the cooling bed in an operationally reliable manner irrespective of any residual curvature or oblique positioning, and may be deposited upon a rollerway in an aligned manner. Time-consuming manual displacement of driver dogs as well as the displacement of cable drums or chain wheels on their common drive shaft by means of worm gears is avoided.

According to a further feature of the invention each cable or chain drive is guided over guide rollers on both sides of the driven cable drum or chain wheel, respectively, the guide rollers being uniformly displaceable in mutually opposite directions transversely to the cable or chain run.

The adjustable guide rollers are advantageously mounted on the arms of a two-armed rocker which is associated with a power source. In this way a simple and operationally reliable apparatus is created.

Advantageously double-acting pressure-means cylinders may be provided as power sources for the rockers.

The apparatus according to the invention may be employed for supplying profiled rods and rails from a rollerway to a cooling bed and for pre-bending them. The apparatus is also employable for discharging profiled rods from a cooling bed as well as for aligning and depositing them on a rollerway.

BRIEF DESCRIPTION OF THE SEVERAL VIEWS OF THE DRAWINGS

One constructional example of the invention is illustrated in the drawings wherein.

DETAILED DESCRIPTION

Figure 1:
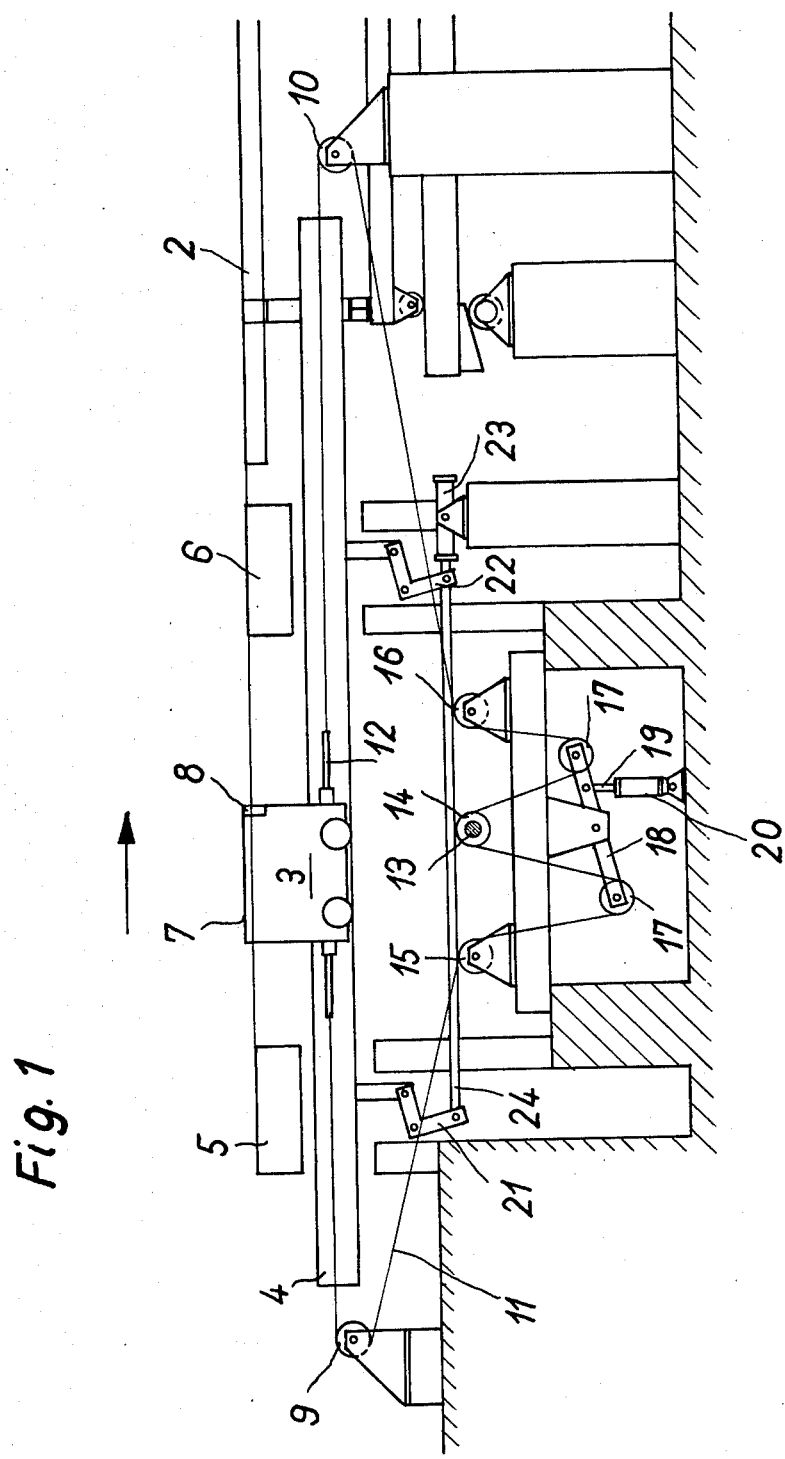
FIG. 1 is a schematic elevation view of an apparatus for supplying profiled rods or rails to a cooling bed.

For the purpose of supplying profiled rods or rails 1 to a cooling bed 2, a plurality of feeder carriages 3 are reversibly displaceable on guide supports 4 away from the region of rollerways 5, 6 as far as the region of the cooling bed 2. The carriages 3 are provided with an upper support surface 7 and in the direction of the cooling bed with a displacement ledge 8. On both sides of each feeder carriage 3, ends of a cable or chain run 11 guided over guide rollers 9, 10 are secured in holders 12. The cable or chain runs 11 of the adjacently arranged feeder carriages 3 are reversibly displaceable synchronously by means of cable drums or chain wheels 14 mounted on a common motor-driven shaft 13.

On both sides of the cable drum or the chain wheel 14, each cable or chain run 11 is guided with the formation of a respective loop over a respective stationary guide roller 15, 16 and a respective adjustable guide roller 17. The adjustable guide rollers 17 are mounted on a respective arm of a two-armed rocker 18. For effecting rocking movement, the rocker 18 is connected to the piston rod 19 of a pressure-medium hydraulic cylinder 20 which is mounted on the foundations. In this manner the feeder carriages 3 can be individually displaced by different amounts by rocking the rockers 18 independently of their common drive by the cable drums or chain wheels 14.

The guide supports 4 of the carriages 3 are vertically adjustably supported on angle levers 21, 22 which are stationarily pivotally mounted and which are always pivotal in pairs by a common horizontally mounted pressure medium cylinder 23 and a connecting rod 24.

For the purpose of transferring profiled rods or rails 1 from feeder rollerways 5, 6 to the cooling bed 2, the guide supports 4 together with the feeder carriages 3 are lowered, so that the carriages 3 can be displaced between the rollerway rollers and under the profiled rods or rails 1 lying thereon, by means of the cable or chain runs 11. By pressurising the cylinders 23 to guide supports 4 together with the carriages 3 and the rails 1 lying upon the support surfaces 7 thereof are raised. Thereafter the carriages 3 are displaced by means of the cable or chain runs 11 to the cooling bed 2 and the profiled rods or rails 1, respectively, are deposited upon the cooling bed 2 by lowering the carriages.

Figure 3:
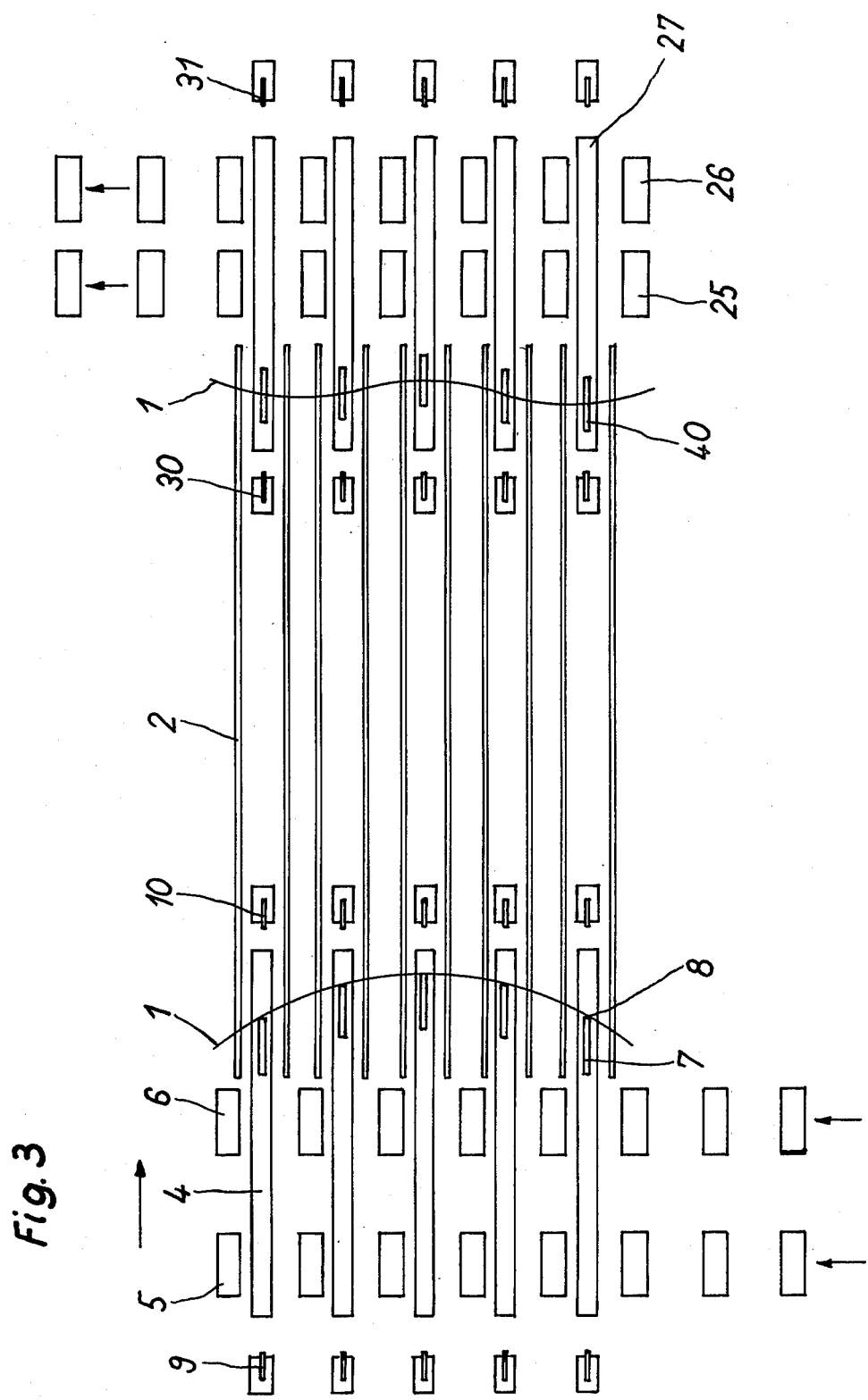
FIG. 3 is a schematic plan of a cooling bed with a preceding supply apparatus and a subsequent discharge apparatus.

As illustrated in FIG. 3, a rail 1 deposited upon the cooling bed 2 can be pre-bent in that initially the feeder carriages 3 together with their displacement ledges 8 are displaced into contact with the rail 1 and are thereafter adjusted in the sense of the desired bending line by different rotation of the individual rockers 18.

Alternatively, however, pre-bending of the profiled rods or rails 1 may even be effected during conveyance on the feeder carriages 3. In this case, different amounts of movement are superimposed upon the common drive of the feeder carriages 3 by the cable drums or chain wheels 14, by means of individual displacement of the rockers 18, so that a pre-bending of the profiled rods or rails is achieved by the end of the displacement path.

Figure 2:
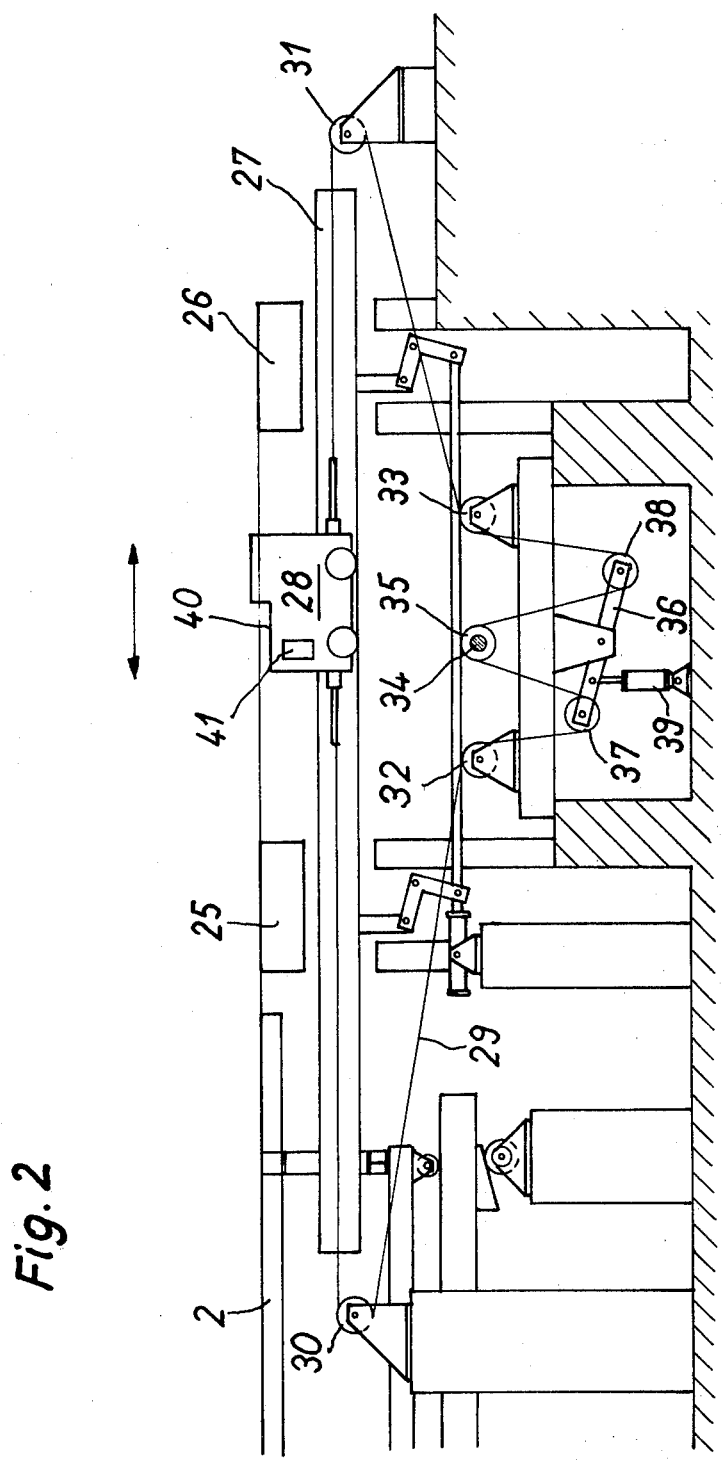
FIG. 2 is a schematic elevation view of an apparatus for discharging the profiled rods or rails from the cooling bed to delivery rollerways.

The delivery of the profiled rods or rails from the cooling bed 2 to subsequent delivery roller ways 25, 26 is rendered difficult by oblique positioning and residual curvature of the profiled rods or rails 1. In order to permit the profiled rods or rails to be received from the cooling bed 2 in correspondence with their individual shape and position and to be deposited aligned upon a rollerway 25 or 26, a discharge apparatus corresponding to the supply apparatus is arranged at the end of the cooling bed 2 (FIG. 2).

A plurality of delivery carriages 28 are displaceable by a respective cable or chain run 29 between the rollers of the rollerways 25, 26 on guide supports 27 which are vertically displaceable by means of hydraulic pressure medium cylinders and connecting rods and angle levers. Each cable or chain run 29 is guided over guide rollers 30 31, 32, 33 and is driven in a reversible manner by cable drums or chain wheels 35 mounted on a shaft 34. Between the guide rollers 32, 33 and the driving shaft 34, the cable or chain runs 29 are guided in a respective loop around guide rollers 37, 38 which are movably mounted on a rocker 36. The rocker 36 is rotatable by means of hydraulic pressure medium cylinder 29.

The delivery carriages 28 are provided with a stepped support surface 40 in which engagement members 41 are arranged for the rail or profile 1 lying on the cooling bed 2. The delivery carriages 28 are displaced in unison by the cable or chain runs 29, until the engagement member 41 of a carriage responds to the rail or the profile 1. Subsequently the other delivery carriages 28 are displaced further by rocking the respective rockers 36, until the support surface 40 of each delivery carriage is positioned accurately under the rail or profile 1 and the same is received by all the delivery carriages 28 upon raising the guide support 27. During delivery of the rail or the profile 1 the same can be aligned with the rollerways 25, 26 by actuation of the rockers 36.

We claim:

1. Apparatus for conveying profiled rods or rails in a direction transverse to their length, comprising a plurality of adjacent carriages for conveying a profiled rod or rail, said carriages being displaceable along said direction of conveyance,
    a respective cable connected to each carriage, a respective rotatable drive means operably connected to each respective cable for driving each cable,
    a common drive means for said respective rotatable drive means for effecting simultaneous displacement of all said carriages, and
    individual displacement means operatively connected with each carriage to effect positive, stepless individual displacement of each said carriage independently of said drive means comprising, guide rollers positioned on both sides of the respective rotatable drive means over which said cable is guided, and means to vertically, uniformly displace said guide rollers in mutually opposite directions.

2. Apparatus according to claim 1, wherein said means to displace said guide rollers comprises a two-armed rocker, said mutually oppositely displaceable guide rollers for each cable being mounted on the arms of the two-armed rocker, and a power source operably connected to said rocker to produce rocker motion.

3. Apparatus according to claim 2, wherein said power source comprises a double-acting pressure-medium cylinder.

4. The apparatus according to claim 1 in combination with a rollerway and a cooling bed,
    said rollerway being arranged upstream of said cooling bed, and
    said apparatus being positioned intermediate said rollerway and said cooling bed for conveying profiled rods or rails from said rollerway onto said cooling bed.

5. The apparatus as claimed in claim 1 in combination with a first rollerway, cooling bed and a second rollerway comprising,
    a first rollerway positioned upstream of a first apparatus as claimed in claim 1, said apparatus being positioned to convey said rods or rails to
    a cooling bed positioned downstream of said first apparatus,
    a second apparatus as claimed in claim 1 positioned downstream of said cooling bed, and a second rollerway positioned downstream of said second apparatus, said second apparatus being positioned to convey rods or rails from said cooling bed to said second rollerway.

* * * * *